United States Patent [19]
Nicholls

[11] 3,910,387
[45] Oct. 7, 1975

[54] HYDRAULIC DAMPERS

[75] Inventor: Lawrence George Nicholls, Birmingham, England

[73] Assignee: Girling Limited, Birmingham, England

[22] Filed: Jan. 14, 1974

[21] Appl. No.: 433,372

[30] Foreign Application Priority Data
Jan. 30, 1973 United Kingdom............... 4663/73

[52] U.S. Cl. ................ 188/322; 277/135; 308/3.5
[51] Int. Cl.² ........................................... F16F 9/06
[58] Field of Search ........... 188/322, 315; 308/3.5; 277/135

[56] References Cited
UNITED STATES PATENTS
2,808,277   10/1957   Binder ............................. 308/3.5
3,203,511   8/1965   Long, Jr. .......................... 188/322

FOREIGN PATENTS OR APPLICATIONS
1,203,435   8/1970   United Kingdom............. 188/322
1,151,653   2/1958   France............................. 188/322
608,933    9/1960   Italy................................. 188/322

Primary Examiner—Trygve M. Blix
Assistant Examiner—Edward R. Kazenske
Attorney, Agent, or Firm—Scrivener Parker Scrivener and Clarke

[57] ABSTRACT

In a monotube hydraulic damper containing a volume of gas a guide for the piston-rod is fixed in the upper end of the tube, and a seal for the piston-rod is located between the guide and a support which is fixed in the tube and through which the piston-rod passes with clearance, a reservoir for oil brought up on the surface of the piston-rod being provided between the seal and the support.

4 Claims, 3 Drawing Figures

HYDRAULIC DAMPERS

This invention relates to improvements in hydraulic dampers of the single or monotube kind in which a valved piston working in a tube is carried by a piston-rod working through a seal at the upper end of the tube of which the lower end is closed.

In dampers of that kind the tube cannot be completely filled with oil or other liquid and contains a volume of air or other gas sufficient to allow for the changes in the internal capacity of the tube as the piston-rod moves into and out of the tube with contraction and extension of the damper. The air or other gas in the tube may be pressurised.

It the gas is not separated from the oil or other liquid by a piston or diaphragm it rises to the upper end of the tube and if the damper is out of operation for any length of time oil from the surface of the piston-rod is not carried up to the seal which is liable to dry out and crack or otherwise become ineffective.

According to our invention a seal for the piston-rod of a single tube damper is located between a guide for the piston-rod fixed in the upper end of the tube and a support which is also fixed in the tube and between which and the seal there is a space forming a reservoir which receives and stores oil brought up on the surface of the piston-rod and keeps the seal wet with oil and free from risk of drying out and cracking.

One advantage of this arrangement is that the guide for the piston-rod is located at the upper end of the tube so that there is a maximum bearing spread between the guide and the piston relative to the overall length of the unit.

Another advantage is that the support on the inboard side of the seal prevents inward movement of the seal. That is important in a damper where the pressure in the tube is relatively low and insufficient to support the seal against inward movement.

Two examples of lubricator embodying our invention are illustrated by way of example in the accompanying drawings in which.

Figure 1:
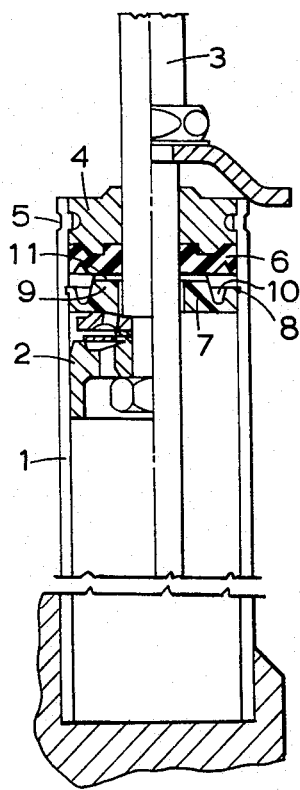
FIG. 1 is a fragmentary section of the upper end of a damper.

In FIG. 1 the damper body is shown at 1 and is normally a drawn steel tube. A piston 2 is carried by a piston-rod 3 which works through a guide 4 fixed in any convenient way as for example by staking it as shown at 5. On the inboard side of the guide there is a seal 6 through which the piston-rod passes and which is a close fit in the tube. On the inboard side of the seal there is a support 7 which is moulded from suitable plastics material having some degree of compressibility and resilience. The support is a close fit in the tube in which it is fixed by machining in the wall of the tube an annular groove 8 into which a portion of the periphery of the support can expand. The bore in the support 7 through which the piston-rod passes is of slightly greater diameter than the piston-rod. On the upper side of the support there is an upstanding central boss 9 which abuts against the under side of the seal and around which is an annular recess 10 forming a reservoir for oil. Radial grooves 11 are formed in the upper surface of the boss to allow oil brought up through the support on the surface of the piston-rod to flow outwardly into the recess 10.

To maintain the overall length of the damper unit as short as possible the piston is allowed to contact the support 7 when the damper is fully extended and the abutment load is transmitted through the support 7 and the seal to the guide 4.

The support 7 being of plastics material will produce a minimum of noise if it should be struck by the piston at maximum extension of the damper.

Figure 2:
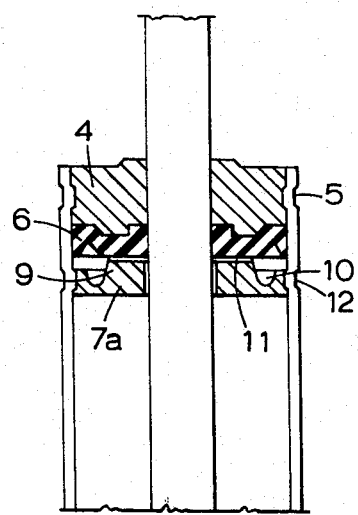
FIG. 2 is a similar section of a modified construction.
Figure 3:
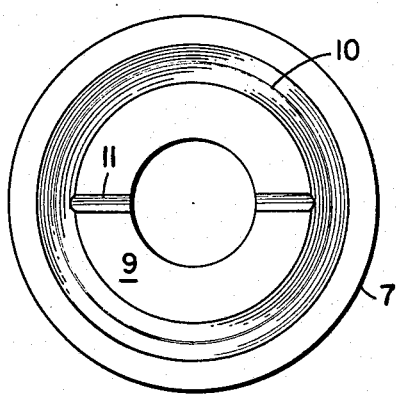
FIG. 3 is an enlarged plan view of the seal support illustrated in FIG. 1.

The lubricator shown in FIG. 2 is substantially the same as that shown in FIG. 1 and the same reference numerals have been applied to corresponding parts but the support 7a is made of metal and is secured in the tube by staking as shown at 12.

I claim:

1. In an hydraulic damper including a tube having a first end and a second closed end, a liquid and a gas in said tube in contact with each other, a valved piston working in said tube and a piston rod secured to said piston and extending through the first end of said tube, the invention which comprises a piston rod guide secured in the extremity of the first end of said tube, a seal located axially inwardly of said guide and sealingly engaging said rod for preventing gas and liquid seepage along said rod, a seal support fixed in said tube, said support and seal having adjacent surfaces which mutually abut for supporting said seal, portions of said adjacent surfaces being shaped to define therebetween a reservoir which receives and stores liquid delivered thereto, and fluid passage means communicating said reservoir with said rod so as to supply liquid from the latter to said reservoir during use of said damper with its first end upright for maintaining said seal wetted during periods when said damper is temporarily not in use, said seal support being of resilient compressible plastic material to provide a resilient stop for said piston at the maximum extension of the damper.

2. In the hydraulic damper as in claim 1 wherein said reservoir is spaced radially from said piston rod, and said fluid passage means comprises at least one generally radially extending passage shaped in said adjacent surfaces.

3. In the hydraulic damper as in claim 2 wherein said reservoir comprises an annular recess in the adjacent surface of said seal support, said passage means comprising grooves in said seal support extending radially inwardly from said annular recess.

4. In the hydraulic damper as in claim 1 wherein said seal support where said piston rod extends therethrough is annularly spaced from said piston rod to provide annular clearance space between said support and said rod.

* * * * *